United States Patent [19]
Bernard et al.

[11] 3,780,338
[45] Dec. 18, 1973

[54] DEFLECTION SYSTEM FOR COLOR-TELEVISION TUBE

[75] Inventors: Jacques Bernard, Noisy le Sec, France; Franco Gatti, Pavia, Italy

[73] Assignee: Ates Componenti Elettronici S.p.A., Milano, Italy

[22] Filed: Jan. 25, 1971

[21] Appl. No.: 109,112

[30] Foreign Application Priority Data

Jan. 23, 1970 Italy .......... 19713 A/70

[52] U.S. Cl. .......... 315/27 R
[51] Int. Cl. .......... H01j 29/70
[58] Field of Search .......... 315/27 TD, 27 R

[56] References Cited

UNITED STATES PATENTS

| | | | |
|---|---|---|---|
| 3,467,882 | 9/1969 | Young | 315/27 R |
| 2,964,674 | 12/1960 | Murakami et al. | 315/27 TD |
| 3,235,766 | 2/1966 | Martin et al. | 315/27 R |

*Primary Examiner*—Carl D. Quarforth
*Assistant Examiner*—J. M. Potenza
*Attorney*—Karl F. Ross

[57] ABSTRACT

The beam of a cathode-ray tube, especially in a color-television system, is horizontally deflected by a saw-tooth-current generator which comprises an autotransformer winding on a common core with four further windings, two of these windings being also capacitively coupled to the autotransformer winding and forming, together with an interposed condenser, part of a reactive loop including the coils of an electromagnetic yoke. The autotransformer winding is intermittently energized by an electronic switch, consisting of a pentode and a diode, in series with a portion of that winding across a source of direct current and feeds a rectifier for supplying a high positive potential to an accelerating anode of the associated cathode-ray tube. The two remaining windings are respectively inserted in the input circuit and in the output circuit of a normally blocked transistor which is unblocked during the flyback stroke to deliver additional energy to the circuit reactances for utilization during the next scan.

9 Claims, 2 Drawing Figures

J. Bernard
F. Gatti
Inventors.

By Karl F. Ross
Attorney

DEFLECTION SYSTEM FOR COLOR-TELEVISION TUBE

Our present invention relates to a sawtooth-current generator for an electromagnetic beam-deflecting system associated with a cathode-ray tube, particularly as used in color television.

Sawtooth-current generators suitable for controlling the horizontal sweep of a cathode-ray tube may include an inductance which, on being intermittently energized by an electronic switch, is traversed by a current flow which changes substantially linearly and at a relatively slow rate in the closed switch position but which follows a generally S-shaped curve upon the opening of the switch, the latter flow lasting for about half a period at the natural frequency of the reactive circuit which may include distributed and/or physical capacitances resonating the inductance at that frequency. The linear phase represents the forward sweep or scanning period whereas the semi-oscillation at the natural frequency constitutes the flyback stroke of the beam. Such circuits have been described in detail in a publication entitled Television Deflection Systems by A. Boekhorst and J. Stolk, printed by Centrex Publishing Co. in Eindhofen, Netherlands.

Generally, the electronic switch comprises a power amplifier such as a pentode tube in cascade with a diode; the inductance energized by this switch may be a primary transformer winding having a portion thereof connected accross a supply of direct current when the pentode is turned on by an applied trigger pulse. The disappearance of the trigger pulse marks the beginning of the flyback stroke which terminates when, after a half-cycle at the aforementioned natural frequency, the voltage across the inductance reverses sufficiently to render the previously cut-off diode again conductive. The next trigger pulse may come into existence at some point later in the cycle.

In some instances, particularly with color-television systems requiring a wider sweep, commercially available pentodes are incapable of supplying the necessary power. Thus, for example, a change of the sweep angle from 90° to 110° requires an increase in power of approximately 50 percent. Circuits heretofore employed for this purpose were relatively complex and expensive.

It is, therefore, the object of our present invention to provide an improved deflection-control system of the general type set forth which enables an expanded sweep with the use of existing power tubes or, conversely, the realization of a given sweep with a less sophisticated electronic switch.

This object is realized, in accordance with the present invention, by the provision of a normally blocked ancillary electronic switch connected to a source of direct current, this ancillary switch being provided with a control winding and an output winding both inductively coupled to the main winding intermittently energized through the main electronic switch and to secondary winding means feeding the electromagnetic deflection coil or coils of the cathode-ray tube. The secondary winding means is advantageously split into a pair of serially interconnected winding sections with an interposed condenser for the reactive storage of additional energy. The main winding, sharing a common core with all the other windings, may be designed as an autotransformer to energize an accelerating anode of the cathode-ray tube with the necessary high positive potential which, in a manner known per se and as likewise described in the above-identified publication, may be up to three times as high as the voltage developed across the pentode.

According to a more specific feature of our invention, the ancillary electronic switch comprises a normally blocked transistor having one of the aforementioned windings connected in its base/emitter circuit and another of these windings connected to its collector. The supplemental energy thus delivered by this transistor to the several transformer windings during the flyback phase is stored in the circuit reactances so as to be available during the next scanning stroke.

The invention will be described in greater detail hereinafter with reference to the accompanying drawing in which.

Figures 1, 2:
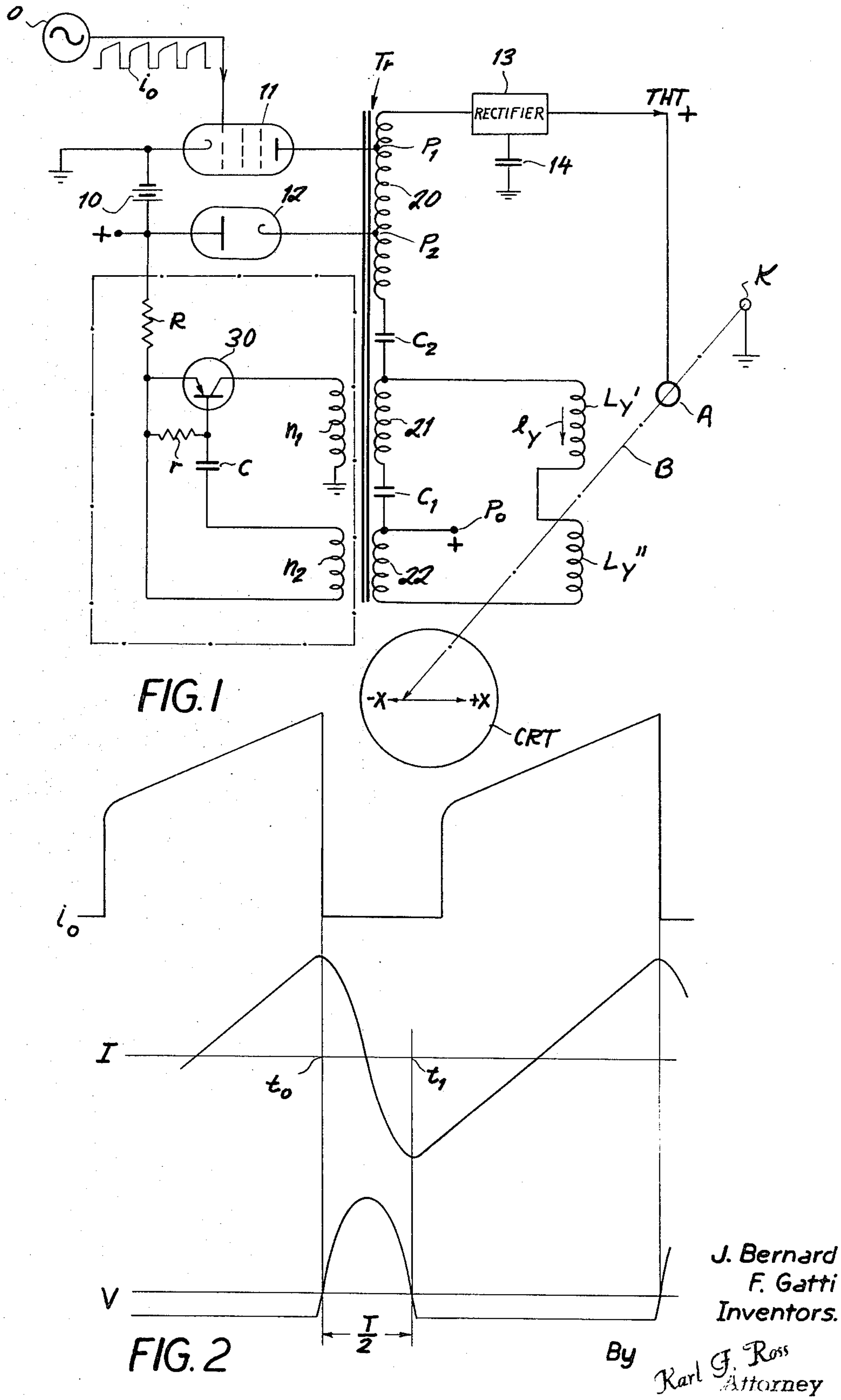
FIG. 1 is a circuit diagram of a preferred embodiment.
FIG. 2 is a set of graphs illustrating the mode of operation of the system of FIG. 1.

In FIG. 1 we have shown the screen of a cathode-ray tube CRT whose beam B is horizontally deflected, between limits $+x$ and $-x$, by an electromagnetic yoke comprising two coils $L_y'$ and $L_y''$ in series. The beam B is emitted by a conventional electron gun, including a cathode K, and accelerated by an annular anode A.

A transformer Tr comprises, on a common core, an autotransformer winding 20, a pair of secondary windings 21, 22 forming together with an interposed condenser $C_1$ a reactive loop also including the coils $L_y'$, $L_y''$, and two further windings $n_1$ and $n_2$. A pentode 11, e.g. of the type EL 509, has its plate tied to an intermediate point $P_1$ of winding 20 and its cathode connected to the negative terminal (ground) of a source of direct current schematically shown as a battery 10. The positive terminal of that source is connected to another intermediate point $P_2$ on autotransformer winding 20 by way of a diode 12, e.g. of type EY 500. The negatively biased control grid of pentode 11 is periodically driven positive by pulses $i_0$ emitted by a square-wave oscillator 0. An extremity of winding 20 beyond point $P_2$ is connected through a capacitor $C_2$ to the reactive loop including the secondary windings 21, 22 and the coils $L_y'$ and $L_y''$ of the yoke for the horizontal beam deflection; the opposite extremity of that winding, beyond point $P_1$, energizes a rectifier 13 with filter condenser 14 whose high-voltage output terminal THT applies positive potential to accelerating anode A.

In accordance with the present invention, we provide an ancillary electronic switch in the form of a transistor 30, here of the PNP type, having its emitter connected via a resistor R to the positive terminal of source 10 and having its collector returned to ground via winding $n_1$. The base of transistor 30 is connected to the emitter through a blocking condenser C in series with winding $n_2$, condenser C forming part of an integrating network which also includes a resistor $r$ spanning the emitter and the base.

As illustrated in FIG. 2, the current I traversing the main winding 20 of transformer Tr, and therefore also its replica $I_y$ passing through the deflection coil $L_y'$, $L_y''$, has a sawtooth shape rising gradually during the scanning phase up to a time $t_0$ and then dropping from a positive peak to a negative peak during an interval T/2 which is half the period of the natural frequency of the circuit including inductance 20 together with the other reactances in series therewith. Time $t_0$ coincides with the end of a trigger pulse $i_0$, applied to the control grid of pentode 11, and marks a sharp rise in the voltage V developed across the winding 20, a similar voltage pulse being generated across the other windings on the core of transformer Tr including the control winding $n_2$ in the input of transistor 30. The transistor now conducts and, during the flyback phase terminated at an instant $t_1$, applies additional energy to the transformer Tr for storage in the associated reactances including winding 20, capacitors $C_1$, $C_2$ and the inductances of the reactive loop described above. This additional energy is therefore available during the next scan to deflect the beam B across the desired sweep angle. Thus, only a part of the electrical energy needed to compensate for circuit losses must pass through the cascaded tubes 11 and 12.

Transistor 30 saturates during a part of the flyback stroke determined, inter alia, by the time constant of integrating network $r/C$. The direct current traversing the coil $n_1$ during that interval depends on the magnitude of resistor R. All these impedances, or some of them, may be made adjustable for a variation of the circuit constants.

It will be noted that a path for the circulation of oscillatory current through winding 20 is provided by a connection of the junction of condenser $C_1$ with winding 22 to a point $P_0$ of fixed potential, this path including the ground return from rectifier 13 by way of filter condenser 14.

We claim:

1. A sawtooth-current generator for an electromagnetic beam-deflecting system, comprising:

coil means forming part of said beam-deflecting system;

transformer means including first, second, third and fourth winding means inductively coupled to one another;

capacitive means resonating said first winding means at a frequency corresponding to a predetermined flyback period, said capacitive means including a capacitor serially inserted between said first and second winding means;

electronic switch means periodically closable for intervals substantially exceeding said flyback period for intermittently connecting said first winding means to a supply of direct current to generate a sawtooth-shaped current flow therein, said second winding means being connected to said coil means for transmitting a replica of said current flow thereto; and a normally blocked ancillary electronic switch connected to a source of direct current, said ancillary switch having a control circuit including said third but excluding said first winding means and an output circuit including said fourth winding means, said control circuit being poled to close said ancillary switch during said flyback period for delivering additional energy to said transformer means by way of said output circuit.

2. A generator as defined in claim 1 wherein said second winding means comprises a pair of windings provided with an interposed condenser and connected in a closed reactive loop with said coil means.

3. A generator as defined in claim 1 wherein said electronic switch means comprises a power amplifier connecting said first winding means to a supply terminal of one polarity and a diode connecting another point of said first winding means to a supply terminal of opposite polarity.

4. A generator as defined in claim 3 wherein said power amplifier comprises a pentode.

5. A generator as defined in claim 4 wherein said first winding means is an autotransformer winding with extremities beyond said points, said capacitor being connected to one of said extremities.

6. A generator as defined in claim 5, further comprising rectifier means connected to the other of said extremities and beam-accelerating means connected to said rectifier means for energization thereby.

7. A generator as defined in claim 1 wherein said ancillary switch comprises a transistor with a base and an emitter included in said control circuit and with a collector included in said output circuit.

8. A generator as defined in claim 7 wherein said control circuit includes a blocking condenser in series with said third winding.

9. A generator as defined in claim 8 wherein said blocking condenser forms part of an integrating network bridging said base and emitter.

* * * * *